United States Patent [19]

Hamanaka

[11] 4,083,740

[45] Apr. 11, 1978

[54] METHOD OF MAKING FANCYWORKS USING PRESSURE-SENSITIVE ADHESIVE

[75] Inventor: Rikio Hamanaka, Kyoto, Japan

[73] Assignee: Hamanaka Kabushiki Kaisha, Kyoto, Japan

[21] Appl. No.: 646,943

[22] Filed: Jan. 6, 1976

Related U.S. Application Data

[63] Continuation of Ser. No. 501,215, Aug. 28, 1974, abandoned.

[51] Int. Cl.$^{2}$ .......... B32B 5/00

[52] U.S. Cl. .......... 156/166; 156/176; 156/177; 156/178; 428/40

[58] Field of Search .......... 35/26; 156/63, 166, 156/176, 177, 178; 428/32, 37, 292–295, 174, 40

[56] References Cited

U.S. PATENT DOCUMENTS

| | | | |
|---|---|---|---|
| 2,148,632 | 6/1936 | Lovejoy | 35/26 |
| 2,456,922 | 12/1948 | Cogovan | 428/114 |
| 2,784,513 | 11/1953 | Urbach | 35/26 |
| 3,130,113 | 4/1964 | Silman | 35/26 |
| 3,132,988 | 5/1964 | Fowler | 428/32 |
| 3,315,374 | 4/1967 | Geraty | 156/63 |
| 3,649,400 | 3/1972 | Sawaki et al. | 156/63 |
| 3,680,225 | 8/1972 | Ishida | 35/26 |

*Primary Examiner*—Marion E. McCamish
*Attorney, Agent, or Firm*—Blanchard, Flynn, Thiel, Boutell & Tanis

[57] ABSTRACT

A fancywork is made by bonding a yarn or yarns in a desired pattern onto the surface of a base plate or sheet of planar or various three-dimensional shape, which surface of the base plate or sheet has been coated with a pressure-sensitive adhesive. The bonding of the yarn is effected by pressing with the fingertip, and an implement for guiding the yarn may be used. A decorative plate for sticking onto various objects is also made similarly by bonding a yarn or yarns on one surface of a base plate or sheet which has been coated on both surfaces with a pressure-sensitive adhesive and cutting out around the circumference of the pattern formed.

3 Claims, 11 Drawing Figures

METHOD OF MAKING FANCYWORKS USING PRESSURE-SENSITIVE ADHESIVE

This is a continuation of application Ser. No. 501,215, filed Aug. 28, 1974 now abandoned.

This invention relates to a method of making fancyworks and to articles made thereby.

Heretofore, articles of fancywork were generally made by first casting on chain stitches to form a substrate and then knitting on that substrate. Although various modifications can be made by changing the knitting order or structure, this conventional method is no more than loop-knitting, and its use and articles made thereby are limited in their scope. Thus it is impossible for the conventional method to make various three-dimensional articles including hats, caps, satchels, bags, etc.

Recently, for the purpose of doing away with the limitations of such conventional knitting, a method has been developed and proposed which, by using a network or grid made of a hard or soft synthetic resin as a substrate with a knitting yarn is knitted on the substrate in various knitting structures. Those conventional methods, however, all are dependent on the use of a knitting needle, and they are not yet free from the restrictions due to the use of a knitting needle, even though the modifications according to the variation of knitting structure may be possible.

It is therefore a general object of this invention to provide a quite novel manual art of making fancyworks, changing the concept of known arts.

Another object of this invention is to provide a method that makes it possible to produce various fancyworks full of variety with cubic effect, without using any knitting needle.

Still another object of this invention is to provide a method of making fancyworks that uses various strings, tapes, etc. in addition to known knitting yarns and is easily practiced.

A further object of this invention is to provide a method that makes it possible to produce various patterns and fancyworks easily, by utilizing a pressure-sensitive adhesive and by pressing said yarns etc. against a base plate coated with the adhesive.

Another important object of this invention is to provide various patterns and fancyworks obtained by the novel and creative method of the manual art.

An essential feature of the present invention that attains the above objects resides in that a plate of plane, hemispherical, or other optional shape, coated in advance with a pressure-sensitive adhesive, is used as a base, and various knitting yarns are bonded by pressing onto the coated surface of the base plate.

Other and further objects, features and advantages of the invention will be apparent taken in connection with the accompanying drawings. It should be explicitly understood, however, that various modifications within the scope of the claims may be made without departing from the spirit of the invention.

Figure 1:
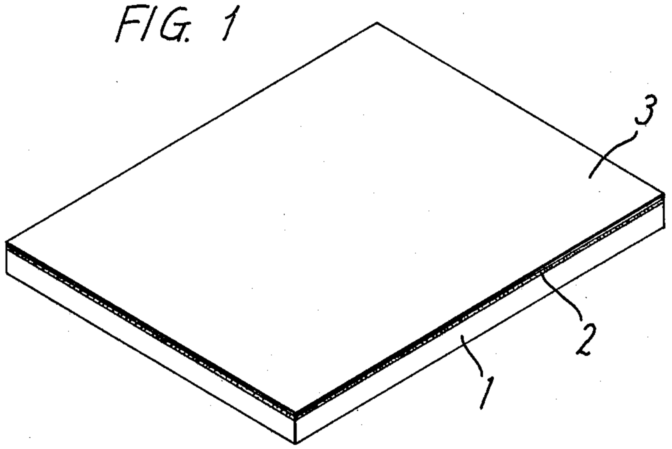
FIG. 1 is a perspective illustration of an example of the base plate used according to the invention.
Figure 3:
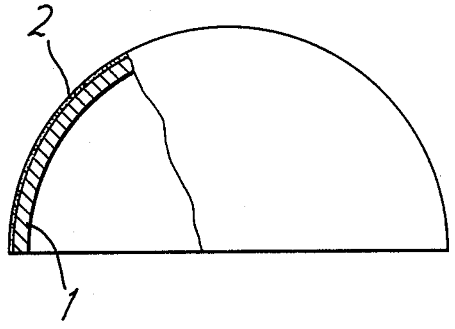
FIG. 3 is a partially cutaway view showing another example of base plate according to the invention.

In FIG. 1, 1 is a base plate made of paper, wood, various synthetic resins, or foamed plastics such as foamed polystyrene, foamed polyester, foamed phenol-formaldehyde resin plate or sheet. The shape of the base plate 1 may be planar as shown in FIG. 1, a hemisphere as shown in FIG. 3, or other optional shape. The surface of the base plate 1 is coated with a pressure-sensitive adhesive to form a pressure-sensitive adhesive layer 2 and is usually further covered with a release paper 3 in order to protect the surface of the pressure-sensitive adhesive layer.

Figure 2:
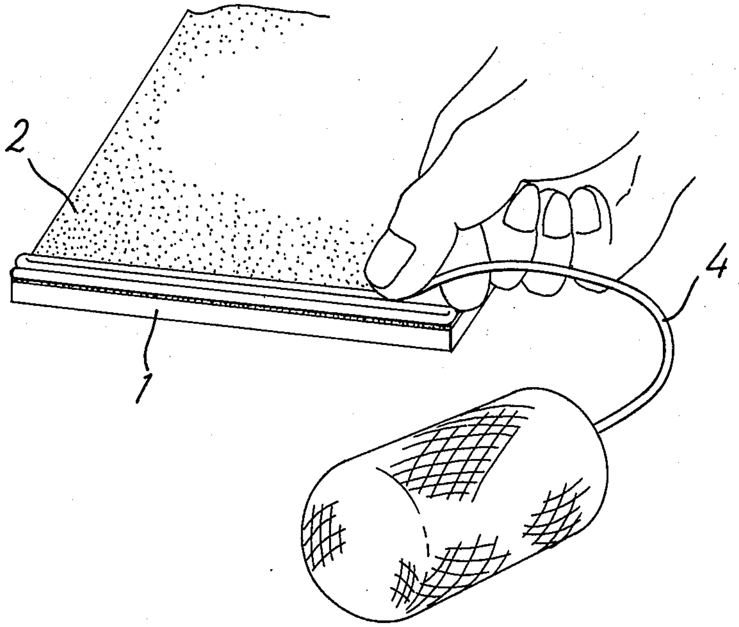
FIG. 2 is an illustrative view of an embodiment of the method according to the invention using the base plate shown in FIG. 1.
Figure 4:
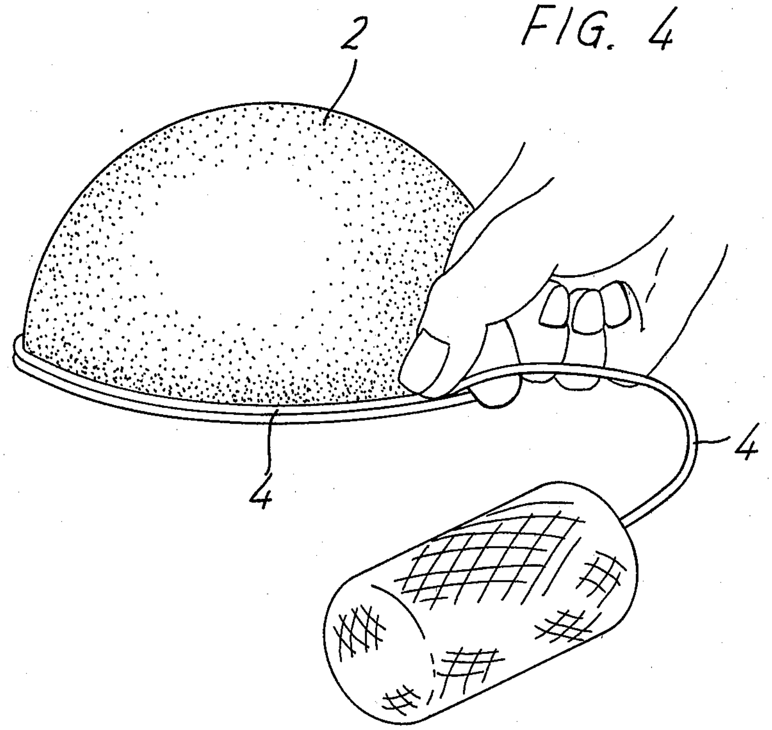
FIG. 4 is an illustrative view of another aspect of the method according to the invention using the base plate shown in FIG. 3.

The pressure-sensitive adhesives to be employed according to the invention are known adhesives including those which contain as their major components natural rubber, polyisobutylene- or polybutadiene-type rubber and are blended with coumarone resin, alkylphenol formaldehyde resin, etc. to improve their adhesive property. To carry out the process of the invention, the release paper 3 is first stripped off from the surface of the adhesive layer 2 and yarns 4 are bonded on the exposed adhesive layer surface by finger pressure, as shown in FIG. 2 and 4, or by using the implement shown in FIG. 5.

The yarn 4 to be employed according to the invention includes those made of natural fiber, synthetic fiber, and other optional fiber and includes also thin threads such as lily yarn, ribbons, tapes and, further, gold thread, silver thread and metallic yarn, the size of which yarn may be selected as required. The yarn 4 may also be yarns, strings, or tapes of various colors or may be a combination of them. And, these yarns 4 are pressure-bonded onto the base plate 1 to form a pattern or in a manner to meet the specific form of the base plate 1 and in a suitable combination of colors.

Thus a fancywork is completed on the basis of the base plate 1 with yarns 4 bonded and arranged in various patterns onto the base plate, in which the base plate may be either a single body to complete one article or a plurality of bodies to form one article in combination.

Figure 9:
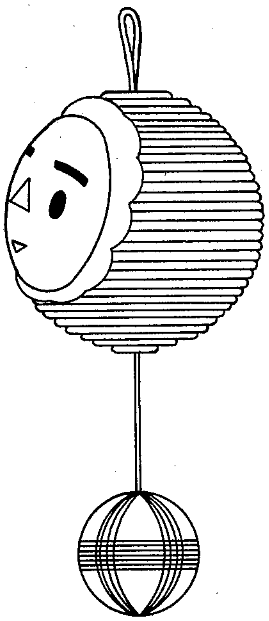
FIG. 9 is a view showing an example of a fancywork obtained by the method according to the invention.
Figure 10:
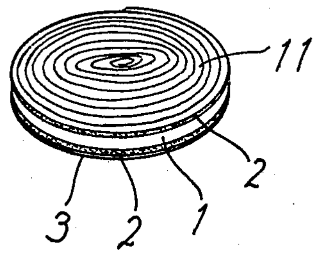
FIG. 10 is a perspective view showing an example of pattern obtained by the method according to the invention.

FIG. 9 shows an example of fancywork which is made by using two large and small hemispherical base plates, as shown in FIG. 3, and by pressure-bonding yarns 4 on the adhesive layers of the base plates in accordance with specified patterns. Beside this, fancyworks of a variety of shapes rich in elegance will be obtained by using optionally base plates with various three-dimensional shapes.

Figure 5:
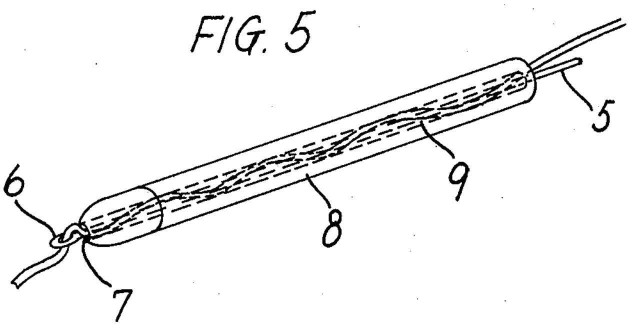
FIG. 5 is a view showing an example of implement used in the method of the invention.
Figure 6:
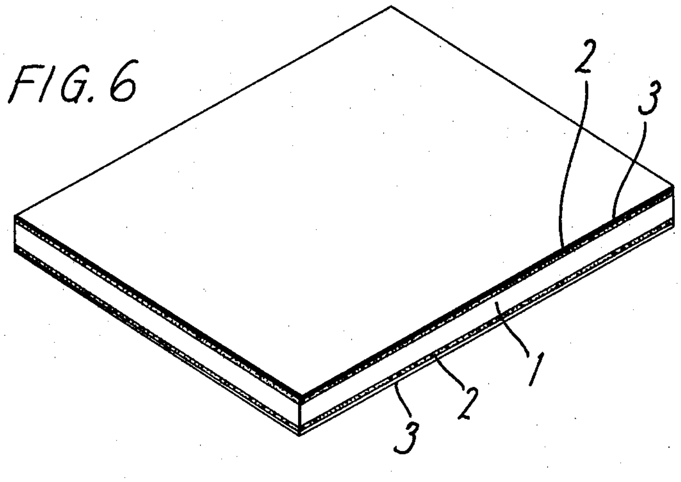
FIG. 6 is a perspective view showing still another example of the base plate used according to the invention.
Figure 7:
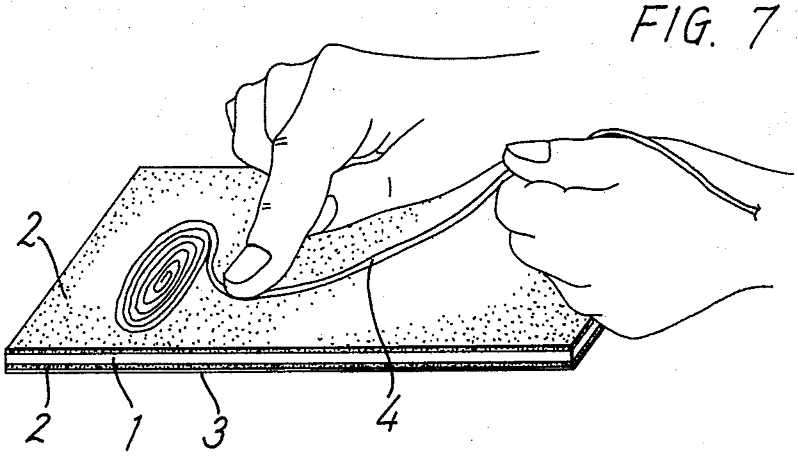
FIG. 7 is a view illustrating the alternate embodiment of the method according to the invention using the base plate shown in FIG. 6.
Figure 8:
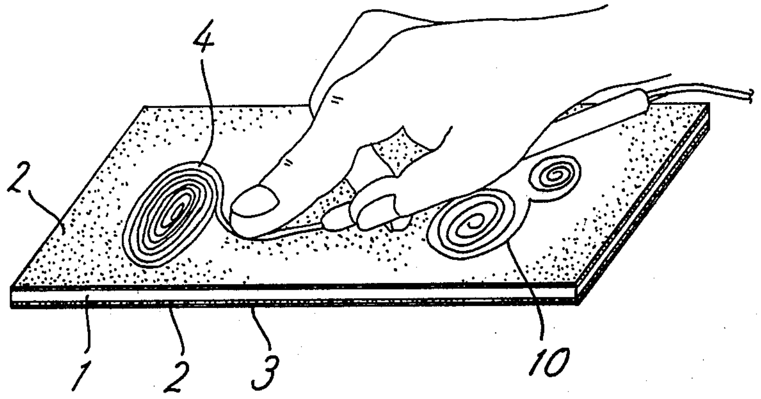
FIG. 8 is a view illustrating another embodiment of the invention using the base plate shown in FIG. 6 and the implement shown in FIG. 5.

FIGS. 6 to 8 and FIG. 10 illustrate other embodiments of the method of the invention, and particularly FIG. 8 shows the use of an implement as shown in FIG. 5. The implement comprises a guiding pipe 8 of pencil-type having at one end a yarn-outlet hole 7 and a leading needle 5 having a thread eye 6 at one end. The end of the yarn to be used is passed through the eye 6 of the leading needle 5 and, after being led through the interior 9 of the guiding pipe 8 by means of the leading needle and having been extended out of the yarn-outlet hole 7, it is pulled out of the eye 6 of the leading needle, and the needle is taken out of the guiding pipe 8, so that the yarn is led through the interior and yarn-outlet hole of the guiding pipe 8 and is ready for bonding.

FIGS. 7 and 8 show the cases, by way of example, in which there is used a plane base plate 1 printed in advance with a design 10 such as a figure, symbols, letters (see FIG. 8) or without print (see FIG. 7), coated on both surfaces with pressure-sensitive adhesive layers 2 2 and further covered with release paper 3 3. In FIG. 8 the release paper on the face is first stripped off, and the design is traced with the point (the yarn-outlet hole) 7 of the guiding pipe 8 which holds the yarn 4 through the interior as mentioned above. The yarn 4 drawn out of the yarn-outlet hole 7 is bonded to the base plate along the design to form a pattern according to it by pressing with the finger tip. While in FIG. 7, the yarn 4 is bonded properly onto the adhesive surface of the base plate 1 to form a pattern according to a design. The pattern thus obtained is cut around the circumference to form a decorative plate 11, which is stuck by pressing onto a desired object 12 such as a fabric, plastics container, or a plate, at desired places or all over the surface by means of the pressure-sensitive adhesive layer on the back surface, after stripping off the release paper from the back surface.

Figure 11:
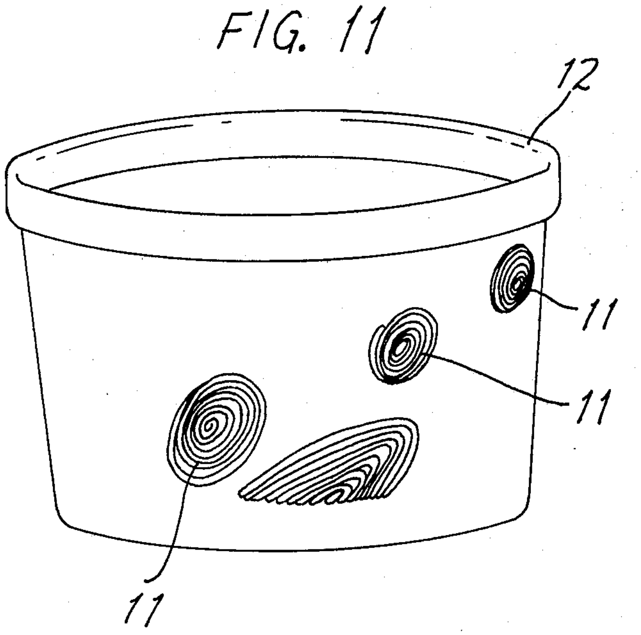
FIG. 11 is a perspective view of an example of article obtained employing the pattern shown in FIG. 10.

FIG. 11 shows an example of an article thus obtained, in which decorative plates 11 are of various patterns according to the design and are also varied in color by selecting the color of the yarn in advance and combining yarns of different colors.

It is also very expedient to provide on the release paper perforations corresponding to the design to make the base plate covered on its pressure-sensitive adhesive surface with a perforated relase paper according to the design.

The method according to the invention, which easily gives, as mentioned above, a fancywork by bonding a yarn by means of finger-pressure on a base plate of plane or cubic three-dimensional shape coated with pressure-sensitive adhesive, entirely changes the concept of the conventional hand-knitting, making it possible to produce various fancyworks of cubic three dimensional effect as desired, and thus widens largely the field of manual arts together with the range of material to be used, making it possible to use strings, tapes, ribbons, etc. as well as usual yarns.

And, the invention provides an art which makes it also possible to form decorative plates that can be easily stuck to any object such as fabrics, plastics articles, wooden ware, and metal goods, regardless of the material, and thus make articles that could not be made previously. The method is also applicable to decorating large-sized furniture and vessels such as ornaments and desks.

Besides, the invention, making it possible to bond patterns on white paper according to one's own impression by pressing the yarn with the fingertip of one hand while guiding it with the other hand without using a guiding pipe, elevates the technique and increases the charm of decoration art of originality.

What I claim is:

1. A method of making a decorative object suitable for attachment to an article to be decorated, which comprises the steps of: providing a base comprising a generally planar member coated on the opposite surfaces thereof with a layer of pressure-sensitive adhesive with each of said adhesive layers being covered by a unitary release paper; stripping off the entirety of one of said release papers from its associated adhesive layer to expose said adhesive layer, while maintaining the other release paper in place covering the other adhesive layer; applying to a localized small area of said exposed adhesive layer a small portion of elongated yarn means and manually pressing said yarn portion against said exposed adhesive layer to adhere said yarn portion thereto, and then serially applying successive portions of said yarn means to successive portions of said exposed adhesive layer and manually pressing the successive portions of said yarn means against the exposed adhesive layer until said exposed adhesive layer on a section of said base is completely covered by yarn adhered thereto; and then cutting said base around the perimeter of said section to separate the remainder of said base from said section so that section provides a decorative object having exposed yarn covering one surface thereof and the other release sheet covering the other surface thereof.

2. A method as claimed in claim 1 including the additional steps of stripping the other release sheet from said decorative object to expose the other adhesive layer thereon and then sticking said other adhesive layer of said decorative object to the article to be decorated so that the exposed yarn on said one surface of said decorative object forms a decorative pattern on said article.

3. A method as claimed in claim 1, in which the yarn portions are serially manually pressed against the adhesive layer by moving a finger or fingers of the user lengthwise along said yarn means and thereby simultaneously pressing successive portions of the yarn means against said adhesive layer.

* * * * *